Jan. 2, 1962 A. H. HUMPHREY 3,015,355
METHOD FOR FORMING SPIRALLY RIBBED TUBING
Filed July 6, 1959
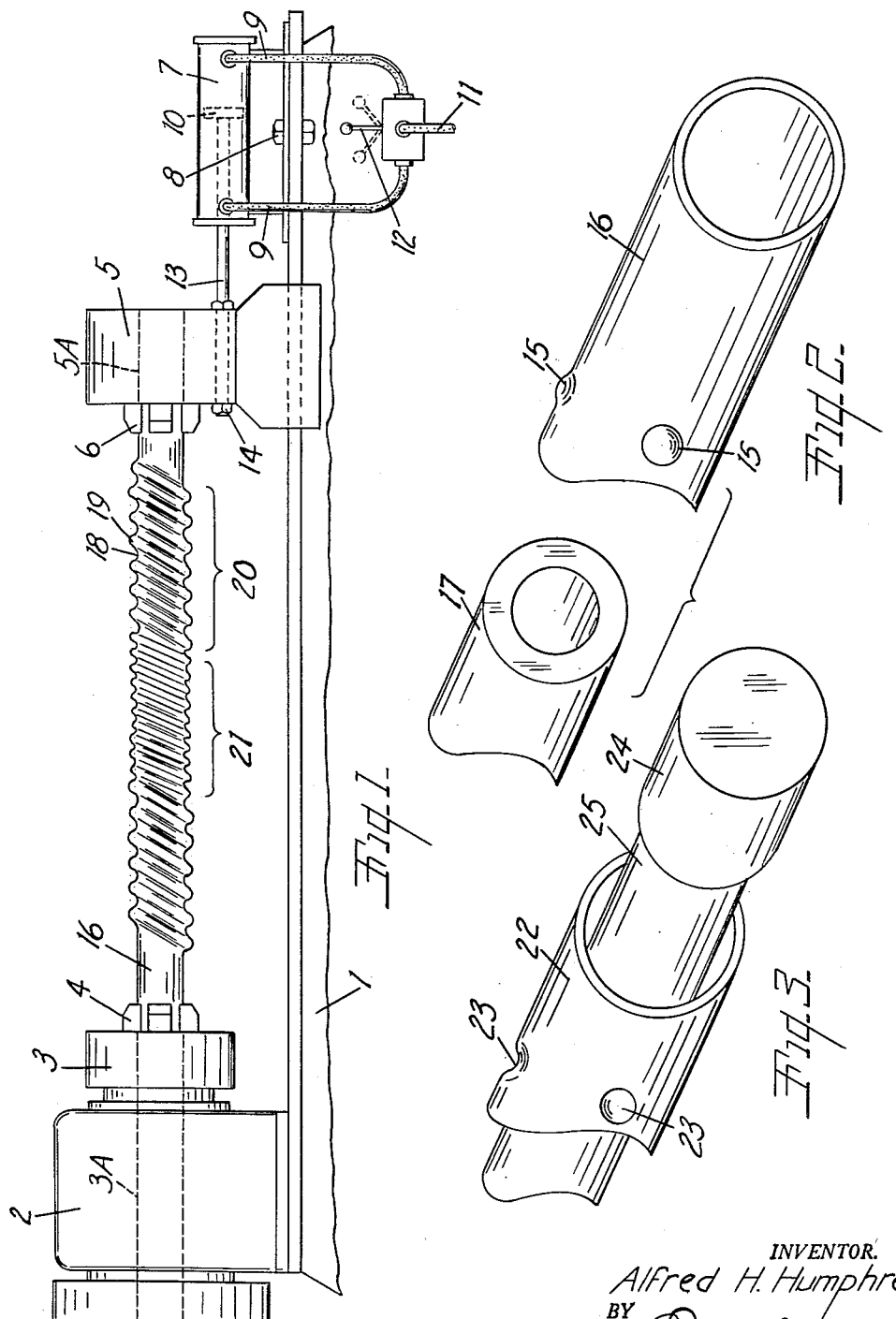
INVENTOR.
Alfred H. Humphrey
BY
ATTORNEY 8,015,355
Patented Jan. 2, 1962

3,015,355
METHOD FOR FORMING SPIRALLY
RIBBED TUBING
Alfred H. Humphrey, Kalamazoo, Mich., assignor to General Gas Light Company, Kalamazoo, Mich.
Filed July 6, 1959, Ser. No. 825,114
8 Claims. (Cl. 153—78)

This invention relates to improvements in method and apparatus for forming variably pitched spirally ribbed tubing. The principal objects of this invention are:

First, to provide a method and apparatus which will rapidly convert a straight walled tubular element such as a metal pipe or tube to a corrugated element having integral spiral corrugations along the length of the element and in which the pitch of the spiral corrugations can be selectively controlled.

Second, to provide a novel method and apparatus for spirally corrugating tubes by means of which the pitch of the spiral corrugations can be selectively controlled and varied along the length of the tube.

Other objects and advantages of the invention will be apparent from a consideration of the following description and claims. The drawings of which there is one sheet illustrate a highly practical form of apparatus and the steps of the method for forming the corrugated tube and a modified form of tube and mandrel element which can be utilized in the process.

FIG. 1 is a fragmentary side elevational view of apparatus for spirally corrugating a tube with a partially corrugated tube therein formed with corrugations of different pitch along the length of the tube according to the process of the invention.

FIG. 2 is a fragmentary perspective view of a first form of tube and mandrel arranged to be utilized in the process of the invention.

FIG. 3 is a fragmentary perspective view of a modified form of tube and mandrel adapted to be used in the corrugating process of the invention.

The present invention constitutes an improvement upon the invention described in Patent # 2,729,266 to Robert P. Humphrey for Apparatus and Method For Making Spirally Corrugated Metal Tubes, application for reissue of such patent was filed December 30, 1957, Serial No. 706,220 now Patent No. Re. 24,783. The above mentioned patent and reissue application illustrate the basic concept of forming a spiral rib or corrugation along the wall of a tubular element by radially offsetting or otherwise changing the resistance to torsion of a selected spot on a periphery of a tubular element and thereafter relatively rotating the ends of the tubular element by torsion forces applied on opposite sides of the offset spot while permitting relative axial movement of the ends of the tubular element so that a spiral groove is formed from the radially offset spot and develops progressively along the length of the tube as it is rotated. This prior patent contemplates the free and substantially unimpeded axial shortening of the tube as the spiral rib is formed in the wall thereof.

The present invention resides in the provision of apparatus and a forming step of selectively applying axial pressure or tension between the ends of the tube while it is being rotated to cause the spiral rib being formed to have a relatively high pitch and wide space or relatively low pitch and close spacing. To this end the drawings illustrate a turning machine such as a lath having a base 1 and head stock 2 with a driven chuck 3 and jaws 4 on one end thereof. A tail stock 5 is slidably mounted on the other end of the base and provided with non-rotatable jaws 6 for gripping the opposite end of the tube from the jaw 4. A fluid pressure cylinder 7 is fixedly mounted on bed as at 8 and provided with inlet conduits 9—9 for delivering fluid pressure to opposite ends of the cylinder and on opposite sides of the piston 10. Fluid pressure is supplied from the pipe 11 through a three way valve 12 to selected ends of the cylinder 7. The piston rod 13 is extended from the cylinder and connected as at 14 to the tail stock 5.

In the first form of the tube shown in FIG. 2, one or more extruded dimples 15 formed in the wall of a metal tube 16 provide starting areas having a different resistance to torsioned forces than the adjacent areas of the tube. These dimples or projections form areas of resistance to torsion by the wall of the tube that are greater than the resistance of adjacent areas of the tube to torsion forces. After the ends of the tube 16 are positioned in the jaws 4 and 6 a mandrel 17 of approximately the inside diameter of the tube 16 is slipped into the tube and clamped there within by the jaws 6. For the purpose of inserting the mandrel, the headstock and chuck may be hollow as at 3A and/or the tailstock and chuck may be hollow as at 5A. The mandrel 17 may be solid or it may be hollow as illustrated in FIG. 2. After the ends of the tube are clamped by the jaws 4 and 6 the head stock chuck 3 and jaws 4 are relatively rotated with respect to the tail stock 5 and jaws 6 and the spiral groove 18 and adjacent rib 19 is formed progressively around the tube from the projection 15. By actuating the valve 12 to retract the piston 10 and connecting rod 13 the tendency of the tube to shorten with the formation of the groove 18 is resisted and the pitch or spacing of the groove is relatively enlarged in the area indicated at 20. After a selected portion of the high pitch groove is formed the valve 12 can be reversed to extend the piston rod 13 and apply compression force on the tube 16 with the result that the pitch and spacing of the ribs will be decreased as in the area 21. The points at which the valve 12 will be actuated will of course be determined according to the desired shape of the finished tube.

FIG. 3 illustrates a modified form of the starting tube in which the tubular element 22 has one or more radially inwardly offset projections or dimples 23 formed therein. This modified tube operates in the same way when twisted in the apparatus shown in FIG. 1 with the grooves 18 starting from the dimples 23. Since the dimples 23 are offset radially inwardly it is necessary for the mandrel 24 which is gripped within the end of the tube by the jaws 6, to have a radially reduced portion 25 to clear the insides of the dimples as the mandrel is placed in the tube prior to clamping and twisting the tube.

As in the above mentioned reissue application, the radially outwardly or inwardly offset dimples constitute localized areas of different resistance to torsion than adjacent portions of the walls of the tube and other means for forming these localized areas of different resistance such as localized heat or grinding away of the wall could be employed. The mandrels 17 and 24 may be removed from the corrugated tube or left therein depending upon the requirements of the end product. A hollow mandrel such as 17 left in the tube 16 with the corrugations 18 twisted tightly into contact with the mandrel forms an ideal heat exchange tube with a straight passage for one fluid through the mandrel and a spiral passage for another fluid through the corrugated outer tube 16.

The function of the mandrel, so far as the formation of the corrugations is concerned, is to radially support the inside of the tube and prevent irregular and excess deflection of the grooves 18 as they collapse inwardly upon twisting of the tube.

What is claimed as new is:

1. The process of forming spirally corrugated tubular elements which comprises the steps of providing a cylindrical tubular element, extruding at least one portion of the wall of said element outwardly from the adjacent areas of the wall and adjacent one end of the tubular element, axially fixedly and rotatably gripping the other end of said element from said extrusion, inserting a mandrel within said tubular element and non-rotatably clamping said one end of said element to said mandrel on the opposite side of said extrusion from said fixed end, rotating said fixed end relative to said one end of said tubular element about the axis of the element, and selectively applying axially directed compression and tension forces to said one end of said element while the element is being rotated to respectively increase and decrease the pitch of the rib formed in said element during the rotation thereof.

2. The method of forming a spiral rib in a tubular element which comprises the steps of radially offsetting a portion of the wall of said element from the adjacent portions of the wall and adjacent one end of the element, relatively and drivingly rotating the ends of said element on opposite sides of said radial offset, and selectively controlling axially directed forces in said element during rotation thereof by means of selectively variable forces applied to the end of said element.

3. The process of forming spirally corrugated tubular elements which comprises the steps of providing a cylindrical tubular element, extruding at least one portion of the wall of said element from the adjacent areas of the wall and adjacent one end of the tubular element, axially fixedly and rotatably gripping one end of said element, inserting a mandrel within said tubular element and non-rotatably clamping another end of said element to said mandrel on the opposite side of said extrusion from said axially fixed end, relatively rotating said ends of said tubular element about the axis of the element, and selectively applying axially directed compression and tension forces to said other end of said element while the element is being rotated to respectively increase and decrease the pitch of the rib formed in said element during the rotation thereof.

4. The process of forming spirally corrugated tubular elements which comprises the steps of providing a cylindrical tubular element, extruding at least one portion of the wall of said element from the adjacent areas of the wall and adjacent one end of the tubular element, axially fixedly gripping one end of said element, inserting a mandrel within said tubular element and clamping another end of said element to said mandrel on the opposite side of said extrusion from said axially fixed end, relatively rotating said ends of said tubular element about the axis of the element, and selectively applying axially directed compression and tension forces to said other end of said element while the element is being rotated to respectively increase and decrease the pitch of the rib formed in said element during the rotation thereof.

5. The process of forming spirally corrugated tubular elements which comprises the steps of providing a tubular element with at least one portion of the wall of said element isolated from the adjacent areas of the wall and adjacent one end of the tubular element having a reduced resistance to torsion stress, axially fixedly gripping one end of said element, radially supporting the interior of said tubular element, clamping the other end of said element on the opposite side of said portion of reduced resistance from said one end, relatively rotating said ends of said tubular element about the axis of the element, and selectively applying axially directed compression and tension forces to said element while the element is being rotated to respectively increase and decrease the pitch of the rib formed in said element during the rotation thereof.

6. The process of forming spirally corrugated tubular elements which comprises the steps of providing a tubular element with at least one portion of the wall of said element isolated from the adjacent areas of the wall having a reduced resistance to torsion stress, axially fixedly gripping one end of said element, radially supporting the interior of said tubular element, clamping the other end of said element on the opposite side of said portion of reduced resistance from said one end, relatively rotating said ends of said tubular element about the axis of the element, and applying axially directed tension forces to said element while the element is being rotated.

7. The method of forming a spiral rib in a tubular element which comprises the steps of radially offsetting a portion of the wall of said element from the axially and angularly adjacent portions of the wall, relatively and drivingly rotating the ends of said element on opposite sides of said radial offset, controlling axially directed forces in said element during rotation thereof by means of selectively variable forces applied to the end of said element, and radially outwardly supporting the interior of said element during such rotation.

8. The method of forming a spiral rib in a tubular element which comprises the steps of relatively altering the resistance to torsion forces of a portion of the wall of said element from the axially and angularly adjacent portions of the wall, relatively and drivingly rotating the ends of said element on opposite sides of said altered portion, controlling axially directed forces in said element during rotation thereof by means of selectively variable forces applied to the end of said element, and radially outwardly supporting the interior of said element during such rotation.

References Cited in the file of this patent

UNITED STATES PATENTS

| | | |
|---|---|---|
| 633,389 | Reynolds | Sept. 19, 1899 |
| 946,631 | Ballou | Jan. 18, 1910 |
| 1,967,487 | Waisner | July 24, 1934 |
| 2,139,143 | Wiswell | Dec. 6, 1938 |
| 2,611,413 | Molinare | Sept. 23, 1952 |
| 2,729,266 | Humphrey | Jan. 3, 1956 |